US005530039A

United States Patent [19]

Nawotka

[11] Patent Number: 5,530,039

[45] Date of Patent: Jun. 25, 1996

[54] PROCESS FOR MANUFACTURING STOPPING COMPOUNDS AND USE OF THE STOPPING COMPOUNDS PRODUCED

[75] Inventor: Otfried Nawotka, Wuppertal, Germany

[73] Assignee: Herberts GmbH, Wuppertal, Germany

[21] Appl. No.: 164,664

[22] Filed: Dec. 9, 1993

Related U.S. Application Data

[63] Continuation of Ser. No. 16,929, Feb. 12, 1993, abandoned.

[30] Foreign Application Priority Data

Feb. 15, 1992 [DE] Germany .......................... 42 04 610.6

[51] Int. Cl.$^6$ .............................. C08J 3/205; C08L 67/00

[52] U.S. Cl. .......................... 523/319; 523/346; 523/353; 528/490; 528/491; 528/497

[58] Field of Search .................................... 523/319, 346, 523/353; 528/490, 491, 497

[56] References Cited

U.S. PATENT DOCUMENTS

| | | | |
|---|---|---|---|
| 3,032,430 | 5/1962 | Heller | 106/477 |
| 3,620,793 | 11/1971 | Gossel et al. | 524/351 |
| 3,893,956 | 7/1975 | Brandt | 524/212 |
| 3,951,849 | 4/1976 | Vickery et al. | 106/429 |
| 3,991,025 | 11/1976 | Kutch et al. | 524/59 |
| 4,217,265 | 8/1980 | Dietz et al. | 524/90 |
| 4,229,329 | 10/1980 | Bennett | 524/44 |
| 4,388,435 | 6/1983 | Loch | 524/901 |
| 4,436,862 | 3/1984 | Tetenbaum et al. | 524/445 |
| 4,497,918 | 2/1985 | Wason | 524/492 |
| 4,543,375 | 9/1985 | Doebler et al. | 524/901 |
| 4,544,581 | 10/1985 | Pelloski | 524/780 |
| 4,664,714 | 5/1987 | Katsura et al. | 524/88 |
| 4,847,316 | 7/1989 | Schick et al. | 524/538 |
| 4,973,519 | 11/1990 | Tortorici et al. | 524/605 |
| 5,164,429 | 11/1992 | Brazelton et al. | 523/313 |
| 5,179,187 | 1/1993 | Pedain et al. | 528/59 |

FOREIGN PATENT DOCUMENTS

| | | |
|---|---|---|
| 0138051 | 4/1985 | European Pat. Off. . |
| 3445109A1 | 6/1986 | Germany . |
| 740776 | 11/1955 | United Kingdom . |

*Primary Examiner*—Paul R. Michl
*Assistant Examiner*—Andrew E. C. Merriam
*Attorney, Agent, or Firm*—Richard A. Speer; Michael O. Warnecke; Keck, Mahin & Cate

[57] ABSTRACT

Process for manufacturing stopping compounds, in particular such as can be used for motor vehicle repair lacquering, in which in a first stage at least 90 wt.-% of the solvents required and 80 to 100 wt.-% of the binding agents required are dispersed together with such a proportion of the pigments and/or extenders as is required in order to ensure that the mixture can be dispersed in a high-speed agitator mill, as well as optionally together with the required additives in a high-speed agitator mill, in particular a bead mill or sand mill, whereupon the dispersed material produced is, in a second stage, mixed with the remaining amounts of pigment and/or extender as well as optionally the remaining amounts of binding agent and solvent and dispersed in a dissolver to the required fineness.

7 Claims, No Drawings

PROCESS FOR MANUFACTURING STOPPING COMPOUNDS AND USE OF THE STOPPING COMPOUNDS PRODUCED

This is a continuation of application Ser. No. 08/016,929 filed on Feb. 12, 1993, now abandoned the text of which is hereby incorporated by reference.

FIELD OF THE INVENTION

The invention relates to the manufacture of filling compounds, in particular filling compounds suitable for industrial lacquering and motor-vehicle lacquering as well as repair lacquering of motor vehicles and industrial objects.

BACKGROUND OF THE INVENTION

In practice filling compounds are produced by dispersing pigments and extenders in solvent-containing binders drying physically in oxidative manner or undergoing chemical curing. In view of the fact that such filling compounds have very high viscosities of the order of 15,000 mPas to more than 100,000 mPas, it has been necessary so far to use for their production special dispersing units, i.e. so-called three-cylinder mills (see Dr. Hans Kittel, Lehrbuch der Lacke und Beschichtungen, published by W. A. Colomb as part of the Heeneman GmbH, 1976, vol. IV, page 64).

However, these dispersing processes cause large amounts of solvent vapours to be discharged into the air, as a result of which they act as environmental pollutants. Dispersal with the aid of modern sand mills or bead mills, which being closed-cycle systems do not allow any solvents or only very small amounts thereof to escape into the environment, has not been possible in the past owing to the high viscosity of the filling compounds. It is difficult, uneconomical and also environmentally polluting to dilute the filling compounds to lower viscosities with a view to their dispersal by means of bead mills or sand mills followed by evaporation of the solvents, since disposal of the evaporated solvents entails the expenditure of energy and the production of noxious liquid or gaseous substances. Dispersal of the pigments and extenders solely with the aid of so-called dissolvers results in products the quality of which is far below the standards required of filling compounds suitable in particular for automobile repairs.

SUMMARY OF THE INVENTION

The invention was therefore intended to provide a process for manufacturing filling compounds capable of being carried out in an environmentally friendly manner and resulting in filling compounds combining improved constancy of quality with purity (homogeneity), fine dispersal and good drawability while leading to good surface characteristics in use.

It has proved that this object can be achieved by dispersing or grinding, in a high-speed agitator mill, in particular a bead mill or sand mill, a part of the filling compound, which may contain up to 100 wt.-% of the solvents required and up to 100 wt.-% of the binding agents required while containing only a part of the pigments and/or extenders to be included in the filling compound, whereupon the material produced is mixed with the remaining amounts of pigment and/or extender as well as optionally remaining amounts of binding agent and optionally remaining amounts of solvent, such additional dispersal being preferably effected in a high-speed disc agitator, i.e. a so-called dissolver.

DETAILED DESCRIPTION OF THE PREFERRED EMBODIMENTS

The object of the invention is therefore a process for manufacturing filling compounds by mixing binding agents, solvents, pigments and extenders as well as optionally additives, said process consisting in that in a first stage preferably at least 90 wt.-% of the solvents and preferably 80 to 100 wt.-% of the binding agents are dispersed or ground together with such a proportion of pigments and/or extenders as well as optionally conventional additives in a high-speed agitator mill, in particular a bead mill or sand mill, as to ensure dispersability in the agitator mill, and in that in a second stage of the process the material contained in the agitator mill is mixed with the remaining amounts of pigment and/or extender as well as optionally the remaining amounts of solvent and binding agents while effecting dispersal with the aid of a high-speed disc agitator, i.e. a so-called dissolver.

By preference, the colouring pigments as well as optionally proportional amounts of the non-colouring pigments and extenders are substantially incorporated in the first stage.

In another preferred embodiment substantially the pigments and/or extenders with fine primary grain, e.g. of the order of less than 0.1 to 5 μm are dispersed in the first stage of the process.

The high-speed agitator mills used according to the invention are in particular bead mills and sand mills and are described e.g. in SURFACE COATING, VOL 2—PAINTS AND THEIR APPLICATIONS; TAFE EDUCATION BOOKS; RANDWICK AUSTRALIA 2031, 1984, page 442 and in EP-A1-0 369 149. The diameter of the beads in bead mills amounts e.g. to about 1–3 mm.

The sand mills or bead mills are closed-cycle systems not permitting any solvents or only very small amounts thereof to escape into the environment.

Dissolvers are high-speed disc agitators, e.g. with large-toothed discs or fine-toothed discs by way of agitating discs. The fine-toothed discs are more suitable for grinding stocks with viscosity values from 10,000 mPas to 50,000 mPas, and the coarse-toothed discs for grinding stocks with viscosity values from 50,000 mPas to 100,000 mPas. Of course, use may be made also of twin-shaft dissolvers having several shafts carrying agitator discs as well as vacuum dissolvers with and without vacuum.

Dissolvers are generally known as dispersing units for manufacturing coating compounds for applications in which requirements are low or for predispersal of grinding stocks intended for the production of coating compounds for more demanding applications, which are subsequently dispersed with the aid of better dispersing units such as three-cylinder mills, bead mills or sand mills.

According to a preferred embodiment of the invention the materials to be dispersed in the high-speed agitator mill, e.g. in the bead mill or sand mill, may, prior to their introduction into the agitator mill, be made into a paste or predispersed in a dissolver.

In order to produce filling compounds, pigment particles and/or extender particles are dispersed in binding agents, this process going hand in hand with the attainment of high viscosities. In the sphere of lacquer paint, primer and stopping compound production, dispersal consists in separating, by means of shear forces and as far as possible, the pigment particles held together by surface forces into the individual pigment particles, i.e. also in grinding them and at the same time wetting them.

The term "pigments" signifies organic or inorganic, tinctorial or non-tinctorial colouring agents which are virtually insoluble in solvents or binding agents. According to this definition also colouring agents which are not tinctorial in film-forming agents with the same or approximately the same index of reflection, i.e. filling compounds capable of dilution in solvents, are deemed to be pigments, e.g. aluminium silicate, kaolin, (ground shale), magnesium silicate (talcum) and silicon dioxide such as finely dispersed silicon dioxide as well as bentonite and hectorite. The non-tinctorial pigments are, in general parlance, also described as extender pigments.

Examples of tinctorial pigments which can be used according to the invention are inorganic pigments such as titanium dioxide, red iron oxide, yellow iron oxide, Prussian blue and zinc sulfide as well as organic pigments such as phthalocyanine blue, phthalocyanine green or azo pigments as well as carbon black.

The particle sizes of the colouring pigments and the extender pigments (non-tinctorial pigments) may vary widely, e.g. in the region of less than 0.1 to 100 μm. Given below are examples of the particle sizes of tinctorial pigments such as are preferably processed in bead mills and of extender pigments such as are preferably processed in dissolvers:

| Tinctorial pigments (less than 0.1 to about 0.3 μm) | | |
|---|---|---|
| | average | |
| types of red iron oxide | 0.2 to 1 μm | |
| titanium dioxide RKB | 0.2 μm | |
| zinc sulfide | 0.3 μm | |
| carbon black | less than 0.1 μm | |

| Extender pigments (about 0.8 to 100 μm) | | | |
|---|---|---|---|
| | | average | maximum |
| 1a) | barium sulfate | 0.8 to 10 μm | |
| 1b) | talcum types | 6 to 25 μm | 50 to 100 μm |
| 1c) | ground shale | 12 μm | 60 μm |
| | calcite | 6.5 μm | 40 μm |

According to the invention it proved possible to solve the problem of environmentally friendly filling compound production, in particular for automobile repair lacquering, in a surprising manner, by e.g. initially grinding only the tinctorial pigments for the filling compound and optionally additional pigments, e.g. calcium carbonate pigments of calcite type using the sand mill or preferably the bead mill, optionally after predispersal by means of the dissolver, whereupon the pigments not imparting colour to the filling compound and pertaining to the group of e.g. aluminium-silicate (kaolin, ground shale), magnesium silicate (talcum) and silicon dioxide were stirred in by means of the dissolver.

Finely dispersed silicon dioxide can be stirred in with the aid of the dissolver, e.g. after dispersing the remaining pigments by means of the agitator mill. Owing to the small particle size, grinding or dispersal by means of an agitator mill is often not necessary. However, joint grinding can also take place in the course of the initial dispersal. This also applies to bentonite and hectorite.

The tinctorial pigments can be dispersed jointly with all binding agents and solvents. It may on occasion be advantageous to mix in a part of the solvent and/or binding agent only after dispersal by means of a bead mill or sand mill and optionally after dispersal with the aid of a dissolver. Small amounts of solvent added at the end may be used e.g. for adjusting the final viscosity or for cleaning the vessels. Binding agents which greatly increase the viscosity may e.g. be added only after dispersal in the bead mill.

With the process according to the invention use may be made of all binding agents conventionally used with filling compounds, such as self-drying binders, e.g..air-drying binders, so-called nitrobinders as well as chemically self- and extraneously cross-linking binders such as polyester.

By way of solvents use may be made of the solvents conventionally used with filling compounds, such as aromatic solvents, e.g. xylene, or aliphatic solvents such as alcohols, e.g. n-butanol and esters, e.g. ethyl acetate.

By way of solvents use may also be made of reactive liquid components, e.g. styrene, as reactive diluents.

It is possible to add conventional filling compound additives such as catalysts (e.g. cobalt octoate).

The filling compounds manufactured according to the invention correspond to the general testing criteria. The process according to the invention entails, in addition to the advantage of considerably reduced solvent emission, improved quality of the filling compounds produced by this method, as well as a shorter production time and less material wastage. The improvement in quality attainable by comparison with the three-cylinder production method extends inter alia to better repeatability of the filling compounds produced, the fact that subsequent corrections are not required or are required only to a very small extent, whereas with any other method such corrections are necessary owing to the evaporation of solvents, and the production of stopping compounds characterised by better drawability, a higher degree of fineness and better surface characteristics as well as a more constant quality.

Owing to their good surface characteristics, the filling compounds manufactured according to the invention lend themselves particularly well to surface lacquering and e.g. for the production of multilayer coatings. They can preferably be used for repair lacquering of motor vehicles, in particular automobile bodies or their components as well as for industrial lacquering of all kinds of appliances.

The invention is explained in the following examples. All percentages relate to mass, unless differently specified.

EXAMPLE 1

128 g of a 45% solution of a styrene-modified alkyd resin (30% styrene, 33% drying oil) in xylene are prepared, whereupon 1 g methylisobutyl ketoxime, 2 g 2-ethoxyethanol, 9 g xylene, 2 g butanol-(1), 10 g red iron oxide (oil number 26 according to DIN 53 199) as well as 226 g of a mixture of 30% zinc sulfide and 70% barium sulfate (oil number 8 according to DIN) are added subject to stirring, without the temperature of the mixture being allowed to exceed 45° C. The thoroughly stirred mixture is dispersed in a bead mill at about 45° C., the retention time amounting to 10 to 45 minutes. Then 66 g talcum (oil number 30 according to DIN) and 56 g ground shale (oil number 26 according to DIN) are admixed in with the aid of a high-speed dissolver and dispersed for 10 to 20 minutes at about 45° C., with the peripheral disc velocity amounting to 16–25 m/sec.

Reference Test A

The same raw materials and quantities as in example 1 are mixed together and ground in three grinding passes with the aid of a three-cylinder mill.

The filling compounds produced according to example 1 and reference test A are applied to a steel sheet. The filling compound according to example 1 is superior to the filling compound according to reference test A in the following respects: cleanliness, fineness, surface characteristics and drawability.

EXAMPLE 2

161 g of a 65% solution of an unsaturated polyester resin in styrene are prepared, and 26 g styrene, 4 g ethanol, 6 g finely dispersed silicon dioxide, 7 g red iron oxide (oil number 30 according to DIN), 8 g titanium dioxide (oil number 19 according to DIN) as well as 112 g calcite (oil number 16 according to DIN) are stirred in, without the temperature of the grinding stock being allowed to exceed 45° C. The thoroughly stirred mixture is dispersed at about 45° C. in a bead mill, with the retention time amounting to from 10 to 45 minutes. Then 68 g micronised magnesium silicate (oil number 30 according to DIN) are added by mixing with the aid of a high-speed dissolver and dispersed for 10 to 20 minutes at about 45° C. and with a peripheral agitating disc velocity of 16 to 25 m/sec. Then 2 g cobalt octoate, 33% in ethyl acetate, are stirred in.

Reference Test B

The same raw materials as in example 2 are ground in the same proportions using a three-cylinder mill and applying two grinding passes.

After mixing in 2% phlegmatised, organic peroxide the filling compounds produced according to example 2 and reference test B are tested in the manner described above. It is found that filling compounds manufactured in accordance with the invention are superior in the following respects: greater cleanliness as well as better surface characteristics and adhesion.

In accordance with a preferred embodiment of the process of the invention, the first stage is carried out under such conditions (such as the choice of the components, the amounts and/or the dispersing conditions) that the product obtained during the first stage has a viscosity of 11000 to 16000 mPa.s. Thereafter, the second stage is carried out under such conditions (such as the choice of the components, the amounts and/or the dispersing conditions) that the finally obtained filling compositions have a viscosity of 50000 to 150000 mPa.s, preferrably of 60000 to 100000 mPa.s. In each case the viscosities are apparent viscosities, i.e. they are measured in a rotary viscosimeter at a shear rate of 15 $sec^{-1}$ at 20° C.

I claim:

1. A process for manufacturing filling compounds comprising:

mixing together at least one binding agent selected from the group consisting of polyester, modified-polyester, alkyd resin and modified-alkyd resin, at least one non-aqueous solvent, at least one compound selected from the group consisting of pigments and extenders and optionally at least one additive;

dispersing together in a first stage at least 90 wt. % of the solvents required and 80 to 100 wt. % of the binding agents required together with a sufficient proportion of the at least one compound selected from the group consisting of pigments and extenders necessary to ensure that the mixture can be dispersed in a high-speed agitator mill, as well as with the at least one optional additive in a high-speed agitator mill, to obtain dispersed material having a viscosity of 11,000 to 16,000 mPa.s; and mixing in a second stage the dispersed material produced with sufficient remaining amounts of pigments and extenders, and optionally sufficient remaining amounts of binding agent, solvent, and additives necessary to result in a filling compound having a viscosity of 50,000 to 150,000 mPa.s after dispersing, and dispersing to the required fineness in a dissolver, to obtain a filling compound having a viscosity of 50,000 to 150,000 mPa.s.

2. A process according to claim 1, comprising, during dispersing in the first stage, incorporating substantially all tinctorial pigments, optionally together with amounts of non-tinctorial pigments and extenders.

3. A process according to claim 1, comprising, during dispersing in the first stage of the process., incorporating substantially all tinctorial pigments and extenders with a primary grain up to 5 μm.

4. A process according to claim 1, wherein the high-speed agitator mill comprises a bead mill, a sand mill, or a closed-cycle bead mill or sand mill.

5. A process according to claim 1, wherein the agitator mill is a closed-cycle agitator mill and the process comprises predispersing the material with the aid of a dissolver.

6. A process for using the filling compounds produced according to one of claims 1 to 5 in connection with multilayer lacquering of industrial objects or motor vehicles.

7. A process for using the filling compounds produced according to one of claims 1 to 5 for industrial lacquering or motor vehicle repair lacquering.

* * * * *